United States Patent [19]

Bähr et al.

[11] 4,371,177

[45] Feb. 1, 1983

[54] SELF-LOCKING SEALING AND WIPER RING

[75] Inventors: Günter Bähr, Weinheim; Erich Habel, Fürth; Werner Hafner, Leimen, all of Fed. Rep. of Germany

[73] Assignee: Firma Carl Freudenberg, Weinheim, Fed. Rep. of Germany

[21] Appl. No.: 309,801

[22] Filed: Oct. 8, 1981

[30] Foreign Application Priority Data

Oct. 20, 1980 [DE] Fed. Rep. of Germany ....... 3039534

[51] Int. Cl.³ .............................................. F16J 15/32
[52] U.S. Cl. ................................... 277/152; 277/205; 277/206 A
[58] Field of Search ........... 277/152, 153, 205, 206 R, 277/206 A, 212 R, 212 C; 285/110-112

[56] References Cited

U.S. PATENT DOCUMENTS 2,841,429 7/1958 McCuistion ................ 277/206 A X
3,563,557 2/1971 Doutt ............................ 277/206 R X
3,612,551 10/1971 Grabill ......................... 277/206 A X

FOREIGN PATENT DOCUMENTS 1190948 4/1959 France ................................. 277/205

Primary Examiner—Robert S. Ward, Jr.
Attorney, Agent, or Firm—Kenyon & Kenyon

[57] ABSTRACT

A ring which provides efficient sealing against pressure differentials. The ring is an elastomer, cylindrical body with a bore, an inside face having inner and outer sealing lips, an outside face having an inner wiping lip and an outer support arm, and an annular support projection joining the outside wall of the body.

6 Claims, 1 Drawing Figure

SELF-LOCKING SEALING AND WIPER RING

BACKGROUND OF THE INVENTION

The invention relates to a self-locking sealing and wiper ring for a pneumatic cylinder. The ring is a cylindrical body of elastomer material having a bore, inside and outside faces having appropriate sealing and wiping lips and an annular projection joining the outside wall of the body.

A sealing and wiper ring of a related type is described in German Petty Patent No. 78 31 104. It is a one-piece ring body of elastomer or plastomer material which is supported by a very wide mounting shoulder disposed on the inward-projecting edge which faces away from the pressure. This arrangement can lead to great difficulties in the assembly as well as disassembly. Accordingly, it is an object of the invention to develop a sealing and wiper ring which permits simplified handling during assembly or disassembly and is nevertheless able to seal against low pressure.

SUMMARY OF THE INVENTION

These and other objects are achieved by the invention which is directed to a sealing and wiper ring for a pneumatic tube. The ring is a cylindrical body of elastomer material having a bore and inside and outside faces which are approximately perpendicular to the bore axis. The inside face has inner and ouer sealing lips disposed around its inner and outer diameters. The outside face has an inner wiper lip disposed around its inner diameter and an outer support arm disposed around its outer diameter. An annular support projection joins the outer diameter wall of the body. The edge of the projection in cross section has a circular arc shape on the projection side directed toward the outside face and a tapered shape on the other side which is sloped at an angle of about 20° to about 40° relative to the bore axis.

In a preferred form, the elastomer material forming the ring has a shore hardness of about 90 to 98 A. Further, preferred embodiments include a ring made of polyurethane elastomer, one wherein the angle of the tapered side of the projection slopes at an angle of about 24° to about 34° relative to the bore axis and one providing efficient sealing up to a maximum pressure differential of about 16 bars.

DETAILED DESCRIPTION OF THE INVENTION

Figure 1:
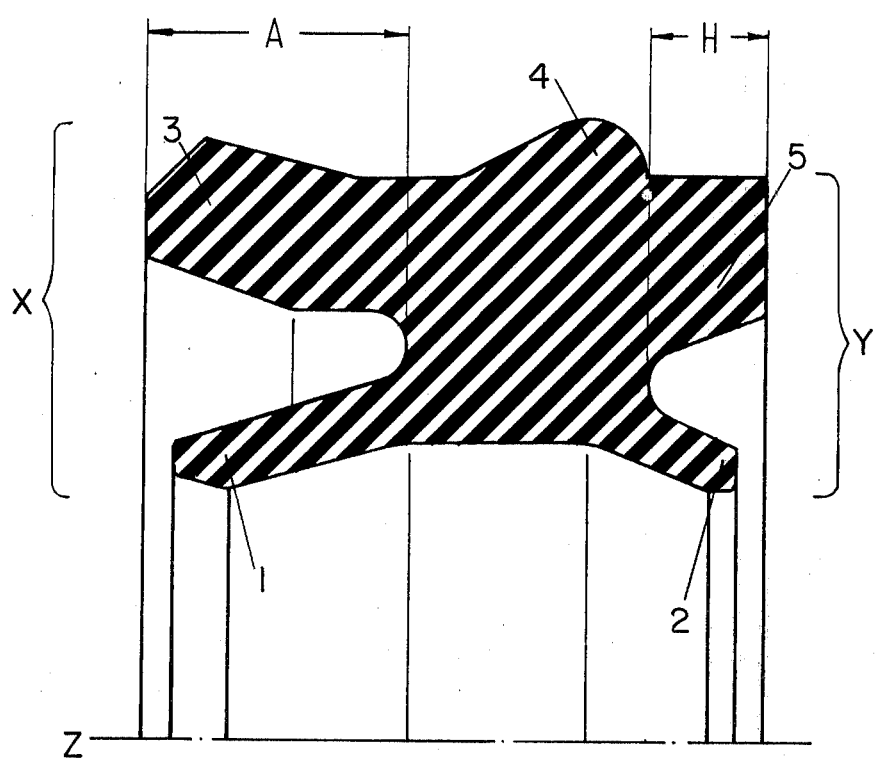
FIG. 1 depicts a preferred embodiment of the ring of the invention. The figure is a cross section along a radial plane through the bore axis of the ring.

The ring of the invention self locks in position when used to seal a piston, rod or other similar part of a pneumatic tube. Typical applications would include shock absorbers, pressurized axle housings, underwater shaft seals, valve seals the the like. Use of the preferred elastomer, polyurethane provides high elasticity and wear resistance as well as high dimensional stability so that a sufficient margin of safety against unintentional loosening is achieved. When employing the ring of the invention, it is not necessary to use secondary support means such as a ledge or projection of the inner wall of the pneumatic tube. The installation can be made without tools when the ring has a nominal diameter of up to 120 mm. and the use of a simple screw driver will be sufficient for disassembly.

The radial cross section of the ring through one side is substantially X-shaped. The inner bars of the X-shaped profile in a plane intersecting the bore axis are the inner sealing and wiper lips. The outer bars extending away from the bore axis are the outer sealing lip and the outer support arm. An outer support projection joins the outer wall of the arm and would be a protrusion from the outer arm bar of the X-shaped profile which extends away from the bore axis. The projection is preferably not arranged at the end of the associated arm, but at a distance inward from the extreme end of the arm. This distance is preferably identical with the length of the arm so that the support projection can be designated as a nodal surface attached to the substantially square shape of the section of the X-shaped ring profile in the vicinity of the center. This preferred embodiment combines in a particularly advantageous manner high safety of anchoring with easy handling during the assembly.

The sealing and wiper ring of the invention is distinguished by high vibration stability. In particular, the firm seating of the foregoing preferred design cannot be affected adversely by vibrations introduced during operation of a pneumatic tube or other device employing the ring.

The features and characteristics of the ring are further illustrated by the preferred embodiment depicted in cross section in FIG. 1. This cross section view is taken along a radial plane through a portion of the ring. Rotation of the pictured section around an axis running from left to right below the Figure would generate the ring. In this embodiment, the ring will typically be made from elastomer polyurethane with a Shore A hardness of 96. It may be formed by machinery, pressure molding, extrusion or other method known to those skilled in the art. It has a substantially X-shaped cross section which is expanded in the central zone in the vicinity of the X intersection to form an approximately square-shaped area.

The cross section profile of FIG. 1 shows the sectional portions of the inside face (X) and the outside face (Y) which are directed toward and away from the sealed off medium respectively. The bore axis would be along line Z or parallel to it and below the profiles of faces (X) and (Y). Inner sealing lip (1) protrudes from the square-shaped central zone and its extreme end forms part of the inner edge of the inside face (X). The extreme end of inner wiper lip (2) forms part of the inner edge of the outside face (Y). Along the outer edge of inside face (X) is located outer sealing lip (3) which has length A. Support projection (4) is arranged along the outer wall in the vicinity of the juncture of lip (3) and the central zone. The projection (4) has a semicircular profile on the (Y) face side which merges into a taper on the (X) face side having a slope angle of about 30° relative to the bore axis. Support arm (5) forms the outer edge of outside face (X). The axial distance of the support projection from the end of the arm (5) and the arm (5) length (H) are identical. The outside diameter of the arm (5) of the complete ring is identical with the inside diameter of the receiving hole of the device into which the ring fits.

We claim:

1. A self-locking sealing and wiper ring of elastomer material for pressure differential shaft sealing, which comprises a cylindrical body having a bore, inside and outside faces approximately perpendicular to the bore axis and an annular support projection joining the outside wall of the body; said inside face having inner and outer sealing lips disposed around its inner and outer diameters respectively; said outer face having an inner wiper lip disposed around its inner diameter and an outer support arm disposed around its outer diameter; and said projection having a circular arc shape in the cross section profile on the projection side directed toward the outside face and having a tapered shape in the cross section profile on the other side which is sloped at an angle of about 20° to about 40° relative to the bore axis.

2. A ring according to claim 1 which is made from polyurethane elastomer.

3. A ring according to claim 2 wherein the polyurethane elastomer has a Shore hardness of 90 to 98 A.

4. A ring according to claim 1 which seals against a pressure differential up to about 16 bar.

5. A ring according to claim 1 wherein the taper of the projection slopes at an angle of about 28° to about 34° relative to the bore axis.

6. A ring according to claim 1 or 5 wherein the length of the support arm is the same as the axial distance from the extreme end of the support arm to the junction of the outer side of the projection and the outside wall of the body.

* * * * *